(12) United States Patent
Lee et al.

(10) Patent No.: US 8,208,109 B2
(45) Date of Patent: Jun. 26, 2012

(54) DISPLAY SYSTEMS HAVING ELECTRICALLY INDEPENDENT REGIONS

(75) Inventors: Da-Wei Lee, Taoyuan County (TW); Jia-Xing Lin, Taipei County (TW); Tai-Ann Chen, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 426 days.

(21) Appl. No.: 12/502,576

(22) Filed: Jul. 14, 2009

(65) Prior Publication Data
US 2011/0013103 A1    Jan. 20, 2011

(51) Int. Cl.
*G02F 1/1343*    (2006.01)
(52) U.S. Cl. .................... 349/139; 349/12; 349/143
(58) Field of Classification Search .................. None
See application file for complete search history.

(56) References Cited

U.S. PATENT DOCUMENTS
2006/0132429 A1    6/2006 Ricks et al.

*Primary Examiner* — Richard Kim
(74) *Attorney, Agent, or Firm* — Finnegan, Henderson, Farabow, Garrett & Dunner, LLP

(57) ABSTRACT

A display system including a first set of conductive electrodes, a second set of conductive electrodes, and a display medium. The first set of conductive electrodes is configured to receive a selection signal. The second set of conductive electrodes is configured to interact with the first set of conductive electrodes for activating the reading or writing of display data. The second set of conductive electrodes is configured to receive a data signal and to activate the reading or writing of a target area of the display device, in response to the selection signal to the first set of conductive electrodes and the data signal to the second set of conductive electrodes. The display medium is movably coupled with the first and second sets of conductive electrodes. One or both of the first and second sets of conductive electrodes have at least two electrically independent regions having an independent signal input for each region.

22 Claims, 6 Drawing Sheets

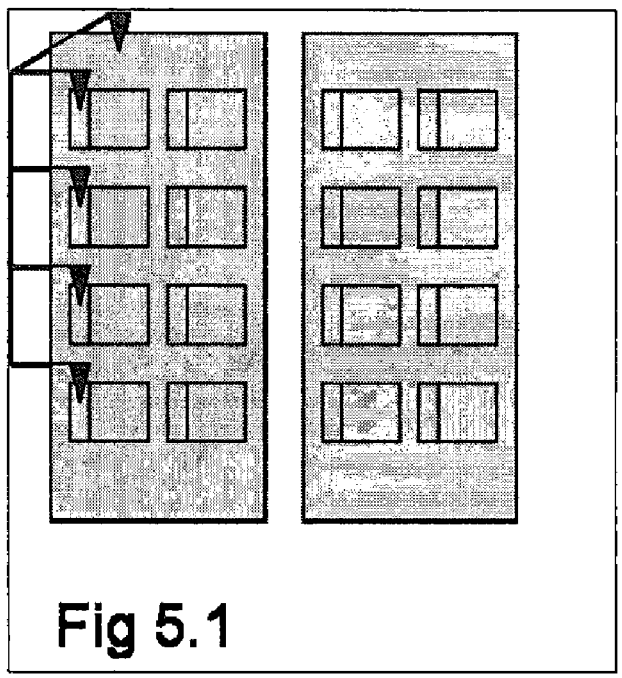
Fig 5.1
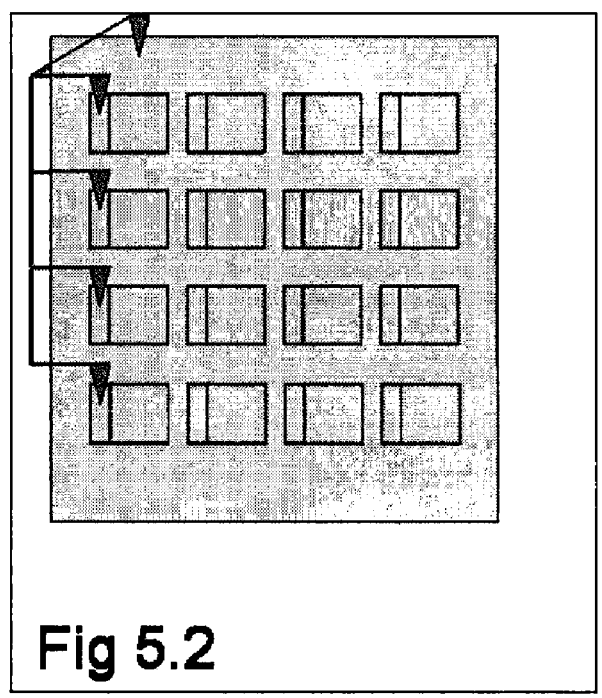
Fig 5.2

DISPLAY SYSTEMS HAVING ELECTRICALLY INDEPENDENT REGIONS

TECHNICAL FIELD

The present disclosure relates generally to display systems, and more particularly to display systems with a movable reading or writing unit having electrically independent regions.

BACKGROUND

Printing used to be the main format of distributing visual information, such as documents, drawings, and images. The development of modern display technologies allows publishers of information to provide and update visual information electronically and, in many cases, remotely. A display or display device may include a large number of pixels, with each pixel formed at the intersection of a row electrode and a column electrode. A display may provide an image when pixels are activated or configured to reflect the various dots that are combined to provide the desired image.

Depending on various driving methods, display mechanisms, or display techniques, display devices generally may be categorized into two types: mono-stable and bistable. A mono-stable display, such as TFT (thin-film transistor) LCD (liquid crystal display) has pixels that may maintain certain optical states when an external electric field is applied. A bi-stable display, such as cholesteric LCD, has pixels that may maintain two or more optical states even after an external electric field is removed. In other words, an image displayed on a bi-stable display device can be maintained without consuming electricity. External power is needed only when displayed images need to be updated or refreshed.

A bi-stable display device may be desirable in some applications to avoid excessive power consumption, the cost of additional circuitry required by mono-stable displays, or both. But bi-stable display devices with a large display area or a high resolution may create technical challenges. For example, when a device is writing a portion of the image to a row, signals are sent to those pixels. The pixels surrounding the selected pixels may be affected by signals, making the surrounding pixels active or partially active. The change of status in those pixels may affect the image level initially provided to those pixels and may reduce the image quality or affect the display effect. Therefore, there may be a need for a display that may overcome or be configured to overcome one or more of the drawbacks of traditional displays.

BRIEF SUMMARY

In one exemplary embodiment, the present disclosure is directed to a display system including a first set of conductive electrodes, a second set of conductive electrodes, and a display medium. The first set of conductive electrodes is configured to receive a selection signal. The second set of conductive electrodes is configured to interact with the first set of conductive electrodes for activating the reading or writing of display data. The second set of conductive electrodes is configured to receive a data signal and to activate the reading or writing of a target area of the display device, in response to the selection signal to the first set of conductive electrodes and the data signal to the second set of conductive electrodes. The display medium is movably coupled with the first and second sets of conductive electrodes. One or both of the first and the second sets of conductive electrodes have at least two electrically independent regions having an independent signal input for each region.

In another exemplary embodiment, the present disclosure is directed to an alternative display system including a display medium, a display activation unit, and a display control device. The display medium is configured to display visual information, and the display activation unit is movably coupled with the display medium. The display activation unit is configured to activate (1) a reading of input data from a target area of the display medium or (2) a writing of display data to the display medium. The display activation unit has two or more electrically independent regions that have an independent signal input for each region. The display control device is coupled with the display activation unit. The display device is configured to supply display selection signal or display data signal to the display activation unit.

BRIEF DESCRIPTION OF THE DRAWINGS

FIG. 5.1 illustrates an exemplary illustration of a portion of a display area being read or written, consistent with certain disclosed embodiments;

FIG. 5.2 illustrates another exemplary illustration of a portion of a display area being read or written, consistent with certain disclosed embodiments;

DETAILED DESCRIPTION

Figure 1:
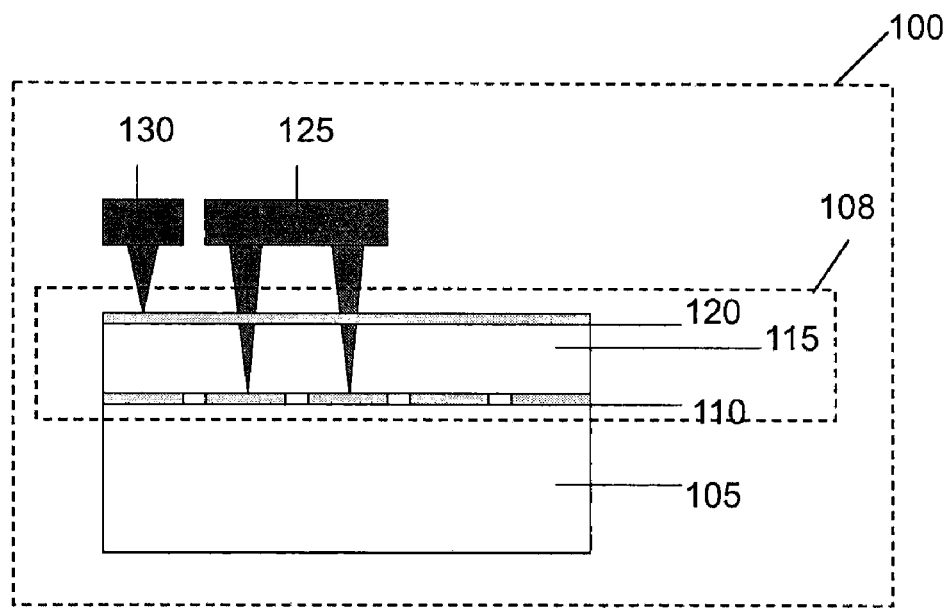
FIG. 1 illustrates an exemplary cross-sectional view of a display system.

FIG. 1 illustrates a cross-sectional view of a display system. Referring to FIG. 1, a display system may be a matrix-type display, such as a passive matrix display device, having write heads 100. The display system may include a substrate 105, a first conductive layer 110 formed on substrate 105, a second conductive layer 120 over first conductive layer 1 10 and spaced apart from the first conductive layer with a display medium 115 between the two conductive layers.

Figure 2:
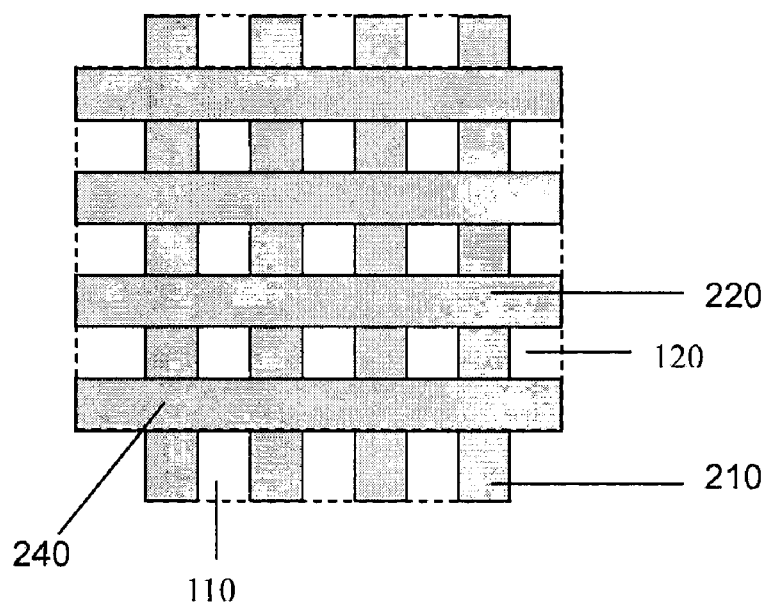
FIG. 2 illustrates an exemplary electrode layout of a display system.

First conductive layer 110 may be patterned into parallel lines or electrodes, with each line forming a first electrode 210 extending vertically as shown in FIG. 2. Second conductive layer 120 may also be patterned into a plurality of lines or electrodes 220 which may extend horizontally as illustrated, which is a direction perpendicular to the axis of the first electrode, such as electrode 210. Each first electrode may intersect with one or more second electrodes 220 to form a targeted area for controlling a display pixel at each intersected area, such as area 240. For illustration purposes, the following embodiments are described with an example of using a bi-stable medium as display medium 115, although other display mediums may be used.

In embodiments having a bi-stable display device, each pixel may have two stable states of displaying visual information. A bi-stable pixel may maintain its display state indefinitely or for an extended period of time without the need constantly refreshing the display state of each pixel. In one embodiment, display medium 115 may be a bi-stable material layer, and may be enclosed in an enclosure or sandwiched between first conductive layer 110 and second conductive layer 120. First conductive layer 110, display medium 115, and second conductive layer 120 may be part of display panel 108 as shown in FIG. 1. In other embodiments, the electrodes may be placed differently, such as at the same side of display medium 115 and may still provide the electrical field needed to control display medium 115.

Figure 3:
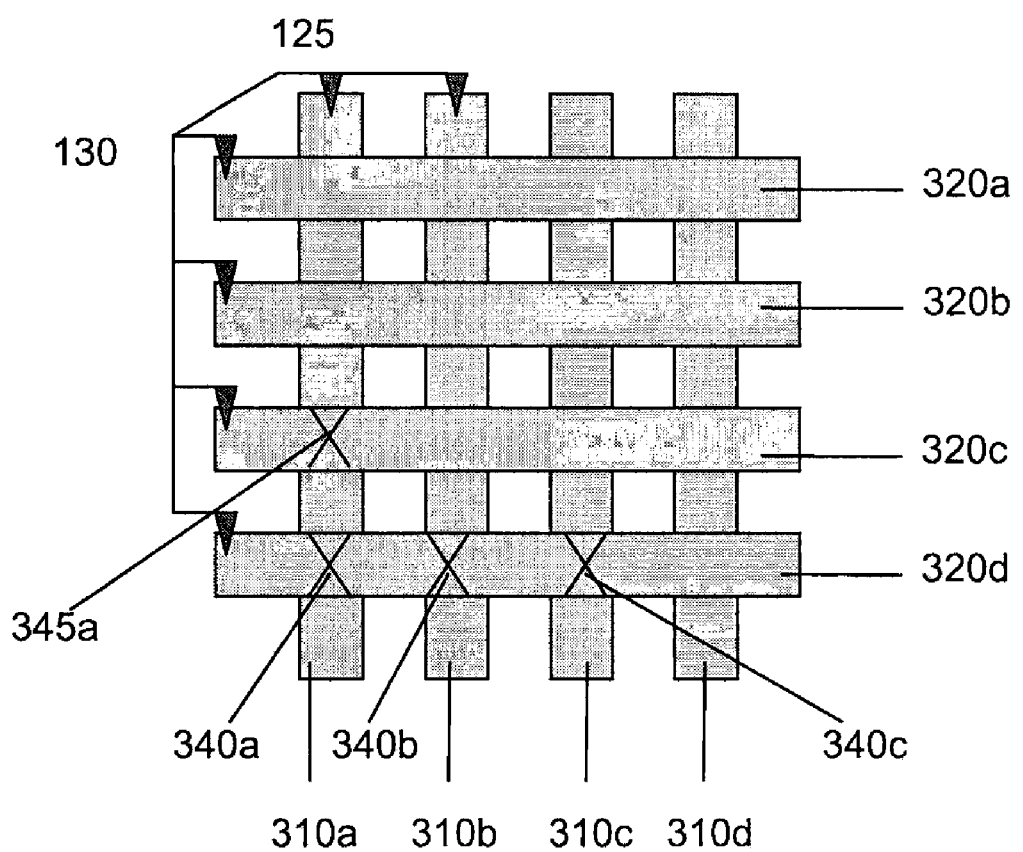
FIG. 3 illustrates another exemplary electrode layout of a display system.

In one embodiment, row or column select signals and data signals may be applied to selected pixels by sending those signals to the corresponding first and second electrodes. FIG. 3 illustrates another exemplary electrode layout of a display system. The electrodes illustrated may be part of the display activation unit, or write or read head, of the display system. The actual display area may be larger than the display activation unit or electrode structure itself. Referring to FIG. 3 as an example, a row select signal may be supplied to electrode 320d to select or activate the pixels on that row. Data signals may then be supplied to the column electrodes, such as electrodes 310a and 310b to output the desired level of data signal or voltage to the corresponding pixels. A desired image is then formed by changing the display states of the bi-stable material at or near the selected pixels.

When portions of the display medium are being updated with new display states, other unaddressed electrodes, such as electrodes 310c and 310d or 320c may be grounded or left floating. However, due to the selection or data signals or the voltage on the nearby electrodes, the display states at some pixels, such as pixels 340c and 345a maybe changed unexpectedly. For example, the display state at pixel 340c may change unexpectedly because the voltage difference between electrodes 310c and 320d is not specifically controlled.

In some embodiments, a display activation unit or head may be divided into two or more electrically independent regions. Also, a display system may include one or more read or write heads that can be moved relative to the display medium. In the example of having a bi-stable display, this may reduce or avoid the need of maintaining a full size read or write head of the size of the display area. Specifically, the system may need only one or a few read, write, or read and write heads to interact with a portion of the display that needs updated reading or writing operations.

Figure 4:
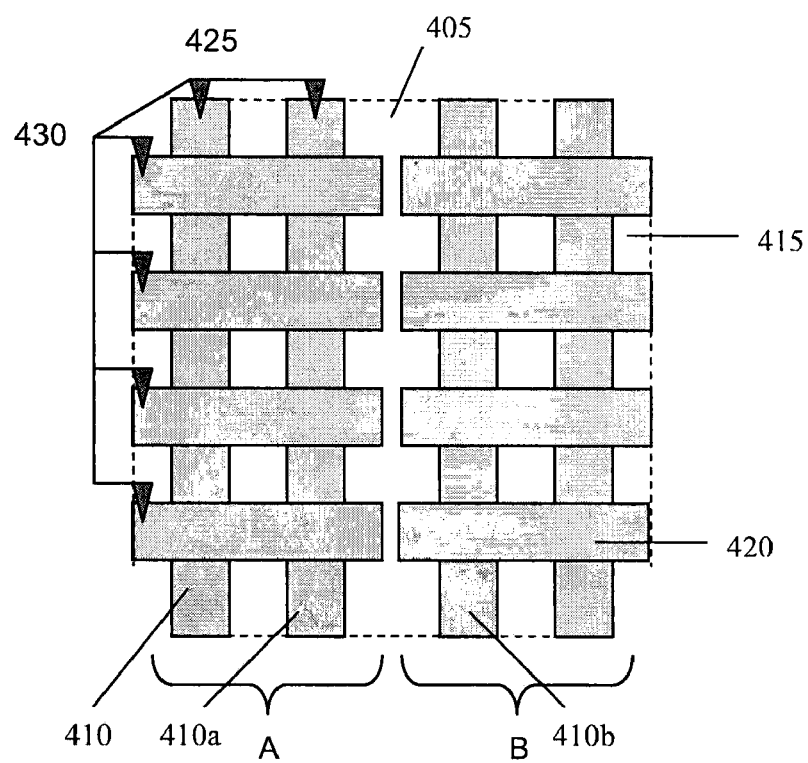
FIG. 4 illustrates an exemplary electrode arrangement for a display system, consistent with certain disclosed embodiments.

FIG. 4 illustrates an exemplary electrode arrangement for a display system, consistent with certain disclosed embodiments. Referring to FIG. 4, the system may include a read or write head or display activation unit, which may include a first set of electrodes, such as electrodes 420 and other electrodes parallel to it. The display activation unit may also include a second set of electrodes, such as electrodes 410, 410a, and 410b, and an additional parallel electrode or electrodes. In one embodiment, the second set of electrodes may extend in a direction perpendicular to the first set of electrodes. The two sets of electrodes may intersect with each other to provide multiple intersected areas, each of which may be used to control one or more display pixels.

Referring to FIG. 4, a display medium, which may be much larger in size than the read or write head, may be sandwiched between the first set and the second set of electrodes or be placed somewhere that may be subject to the electrical field formed by the two sets of the electrodes. In other words, one or more read or write heads may be placed near one side of a display device or medium or sandwich both sides of a display device or medium. The head may have no contact or have contact with the display medium in various embodiments.

The interaction between the first and second sets of electrodes may form an electric field at certain intersected areas. The electric field may change the light transmission properties of a display medium, such as a bi-stable material at the corresponding pixel, to form a desired image. In one embodiment, the change of states may include changing the state of the bi-stable material from one state to a desired state, such as from a reflective state to a transparent state, or the opposite, to provide the designed display effect. As illustrated earlier, the bi-stable material may maintain a given state after the electric field is removed. Accordingly, the read or write head(s) may proceed to process other areas of the display medium by moving the head(s) in relation to the display medium or moving the medium in relation to the head(s). Examples of bi-stable materials may be, but not limited to, a liquid crystal material, electropheric material, electrochronic material, magnetic material and electrochemical material.

In one embodiment, the first set of electrodes, such as electrode 420 and other parallel electrodes, may be formed by patterning a first conductive layer 405. Each horizontal line as illustrated in FIG. 4 may have two or more electrodes in two or more electrically independent regions. The second set of electrodes, such as electrodes 410, 410a, and 410b and additional parallel electrode or electrodes may be formed by patterning a second conductive layer 415.

Referring to FIG. 4, the first, second, or both sets of electrodes may have two or more regions that are electrically independent. As an example, the first set of electrodes, such as electrode 420 and its parallel electrodes, may have two regions that are electrically independent and may be controlled separately. Because the electrodes within each region become shorter, the effect of interference on neighboring pixels may be reduced in some embodiments. Therefore, interference by reading or writing operations on adjacent pixels may be reduced or eliminated.

Due to the electrical independence of the electrodes in regions A and B, crosstalk in region B may be reduced or eliminated while the image of the region A is being updated or accessed. Moreover, because the display medium may be electrically divided into two or more regions, each electrically independent region may include a smaller number of pixels. Accordingly, the parasitic capacitance between electrodes in each region may also be reduced in some embodiments. In the embodiment of having a writable display system configuration, a more accurate reading, such as capacitance measurement, across each pixel may lead to more accurate image detection.

Figure 5:
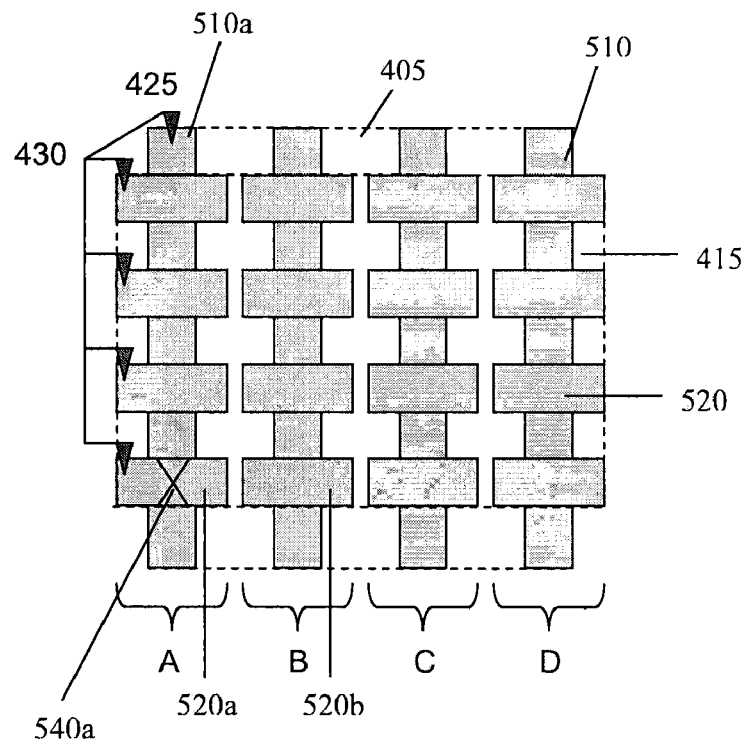
FIG. 5 illustrates another exemplary electrode arrangement for a display system, consistent with certain disclosed embodiments.

FIG. 5 illustrates another exemplary electrode arrangement for a display system, consistent with certain disclosed embodiments. Referring to FIG. 5, the first set of electrodes, i.e. the horizontal electrodes, may have four electrically independent regions. Second electrodes, such as electrodes 510 and 510a, may interact with the first set of electrodes 520 to activate the reading or writing of certain targeted area of a display medium, such as pixel 540a.

The electrically independent regions A, B, C and D may be controlled separately, and the display system may include a display control circuit to control the electrodes in separate regions separately. As a result, a display medium area under or near the reading or writing head may be divided into a number of regions, each of which may be controlled or accessed independently without having much interference on other regions. Additionally, the vertical electrodes, such as electrodes 510a and 510, may be segmented by the horizontal electrodes into multiple segments, such as segments 520a and 520b.

In some embodiments or applications, the electrically independent regions may reduce or eliminate crosstalk among different regions or pixels. For example, when some or all pixels in region A are updated by using vertical electrode 425 and horizontal electrode 430, crosstalk may be reduced because horizontal electrodes 430 in region A are independent from other horizontal electrodes in other regions. Similarly, when an external image input to a display medium in region A is sensed or read by using vertical electrode 425 and horizontal electrodes 430 to read from pixels, such as pixels 510a and 520a, parasitic capacitance may be reduced because horizontal electrodes 430 in region A are electrically independent from other horizontal electrodes in other regions. The electrical independence among different regions may allow more accurate image detection. Although FIGS. 4 and 5 illustrate separating only the horizontal electrodes into separate regions, the vertical electrodes or both of the vertical electrodes and horizontal electrodes may be separated into two or more regions.

In one embodiment, the horizontal electrodes may be row-selection electrodes accepting selection signals, and the vertical electrodes may be data electrodes accepting display data signals or reading image data from the display medium. In another embodiment, the roles of the horizontal and vertical electrodes may be swapped or both sets of electrodes may be involved in providing both selection and data signals.

FIG. 5.1 illustrates an exemplary illustration of a portion of a display area being read or written, consistent with certain disclosed embodiments. Referring to FIG. 5.1, the portion of the display medium may be further separated into two regions that correspond to the horizontal electrodes along the same horizontal axis but are operated or controlled independently. FIG. 5.2 illustrates another exemplary illustration of a portion of a display area being read or written, consistent with certain disclosed embodiments. Referring to FIG. 5.2 the portion of the display medium may be within the same region or be further separated, vertically, horizontally, or both, into two regions that correspond to the electrodes that are arranged along the same horizontal or vertical axis but are operated or controlled independently.

Figure 6:
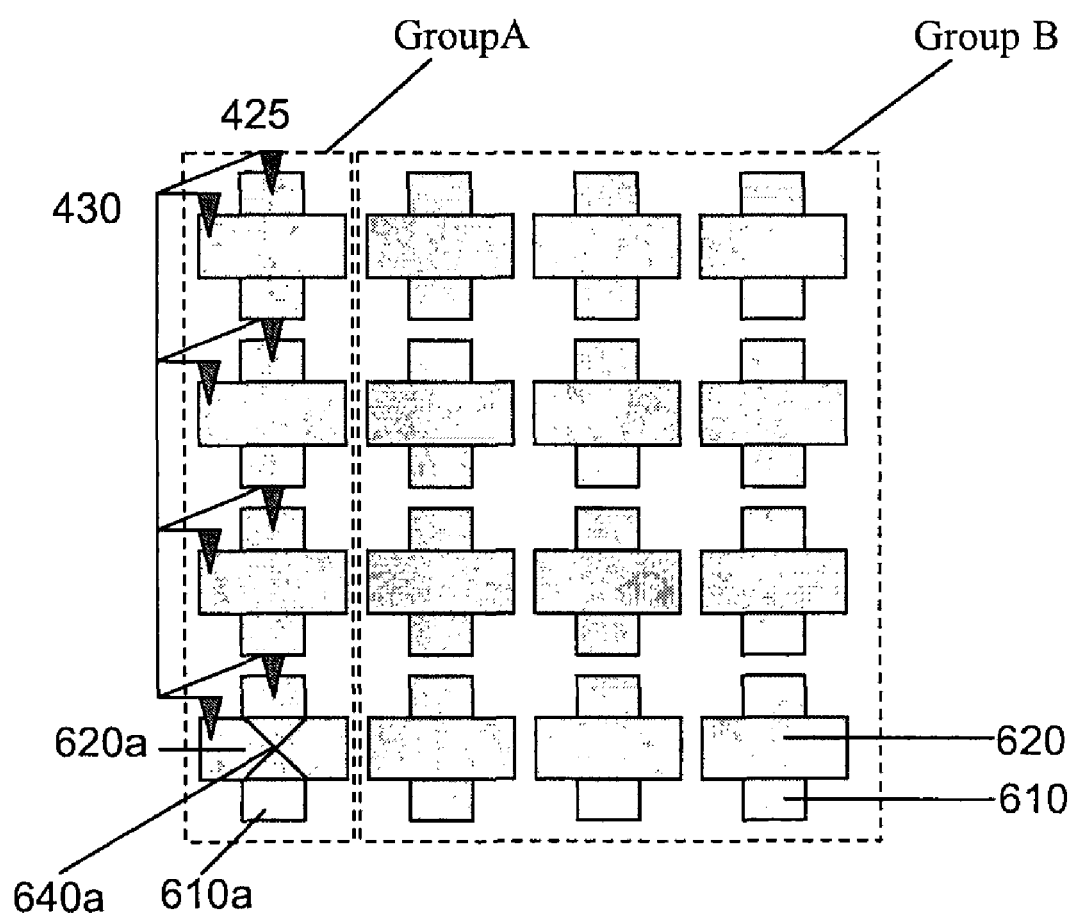
FIG. 6 illustrates another exemplary electrode arrangement for a display system, consistent with certain disclosed embodiments.

FIG. 6 illustrates another exemplary electrode arrangement for a display system, consistent with certain disclosed embodiments. Referring to FIG. 6, both the horizontal and vertical electrodes may be divided into multiple regions, such as four regions in each set. Each intersected "region" may serve one or multiple pixels. In some embodiments, although FIG. 6 illustrates having only one pixel or one pair of intersected electrodes in each of the intersected regions, there may be more than one pixel or more than one pair of intersected electrodes in each intersected region.

In one embodiment, each pixel of a display system may have a vertical electrode, such as electrode 610, and a horizontal electrode, such as electrode 620. The display system may also have a display medium near or sandwiched by the vertical and horizontal electrodes. Due to the electrically independent regions, when the image in one pixel is being updated by using electrodes 425 and 430, crosstalk affecting other regions may be reduced or eliminated. Similarly, when an external image input to the display medium are read or sensed by using electrodes 425 and 430, there may be no or limited parasitic capacitance. The electrical independence may therefore lead to a more accurate image detection or writing of display data.

Figure 7:
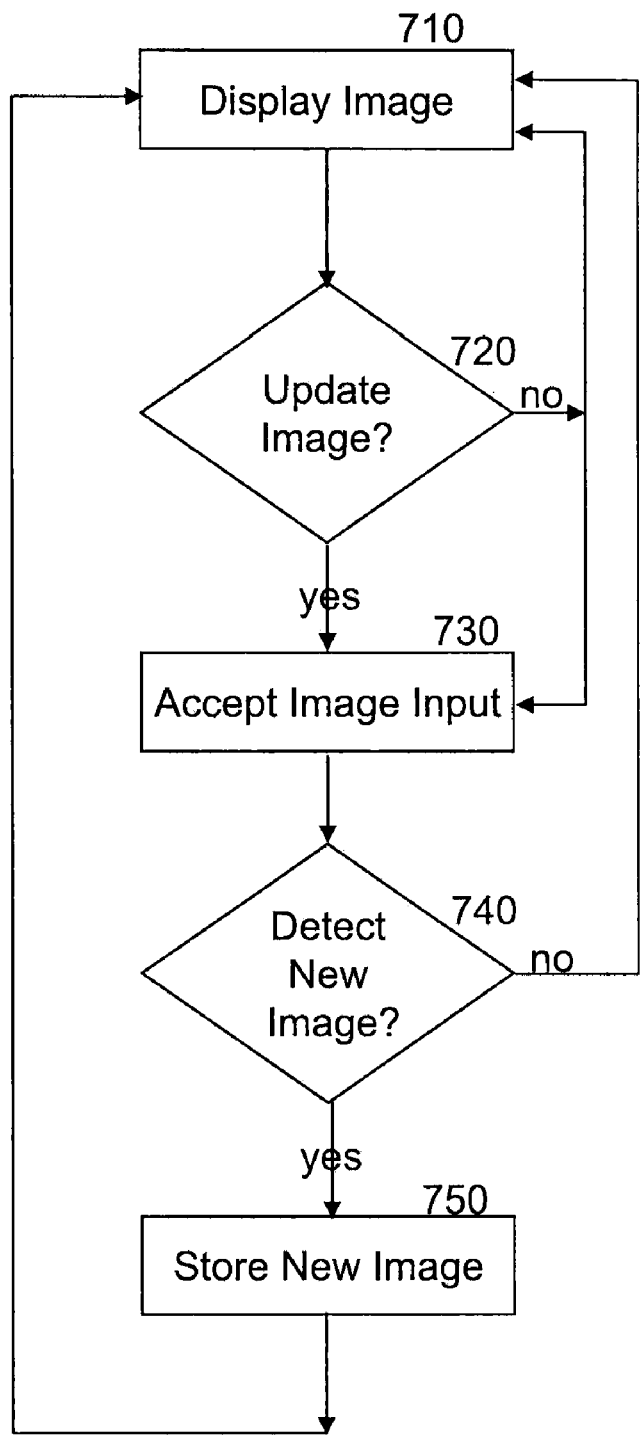
FIG. 7 illustrates an exemplary flow chart of detecting external image input with a display system, consistent with certain disclosed embodiments.

FIG. 7 illustrates an exemplary flow chart of detecting external image input with a display system, consistent with certain disclosed embodiments. Referring to FIG. 7, a display system may be provided with an initial or previous image at step 710 in one embodiment. At step 720, the display system may determine if there is a need or request for image update. If there is, the display system may be configured to accept external image input at step 730. In some embodiments, the display medium may be configured to sense or accept external image input via one or more of thermal, optical, magnetic, electrical, resistive, inductive, mechanical, and pressure sensing techniques. The external image input may come from handwriting or other forms of input. At step 740, a display activation unit, such as a read or write head may be configured to detect the external image input. Depending on the manner the display medium receives the image input, the manner of detecting it may vary. For example, the two sets of electrodes illustrated above, may be used to detect the external image input. For example, the electrodes may read the capacitance level at each pixel to determine its optical state in some embodiments. The display system may include a memory device for storing detected image data at step 750.

Therefore, as illustrated in the embodiments above, a display system may include a first set of conductive electrodes, a second set of conductive electrodes, and a display medium. The first set of conductive electrodes is configured to receive a selection signal. The second set of conductive electrodes is configured to interact with the first set of conductive electrodes for activating the reading or writing of display data. The second set of conductive electrodes is configured to receive a data signal and to activate the reading or writing of a target area of the display device, in response to the selection signal to the first set of conductive electrodes and the data signal to the second set of conductive electrodes. The display medium is movably coupled with the first and second sets of conductive electrodes. One or both of the first and the second sets of conductive electrodes have at least two electrically independent regions having an independent signal input for each region.

Alternatively, a display system may include a display medium, a display activation unit, and a display control device. The display medium is configured to display visual information, and the display activation unit is movably coupled with the display medium. The display activation unit is configured to activate (1) a reading of inputted data from a target area of the display medium or (2) a writing of display data to the display medium. The display activation unit has two or more electrically independent regions that have an independent signal input for each region. The display control device is coupled with the display activation unit. The display device is configured to supply display selection signals or display data signals to the display activation unit.

In one embodiment, the display activation unit may include the first and second sets of electrodes as illustrated above. In other words, the first set of conductive electrodes is configured to receive a selection signal and the second set of conductive electrodes is configured to interact with a first set of conductive electrodes. Similarly, the display medium may be remotely coupled with the display activation unit without having contact with the conductive electrodes.

In one embodiment, the display medium may be remotely coupled with the first and second set of conductive electrodes without having contact with the conductive electrodes. In other embodiments, some or all of the electrodes may have contact with one or both sides of the display medium, which may have enclosures surrounding it. The first and second sets of electrodes may be provided as a part of a display reading or writing unit (or "head") that is movably coupled with the display medium. The display system may have a display control circuitry being configured to perform one or both of (1) providing the selection signal and the data signal; and (2) identifying one or more electrically independent regions for supplying the signals to. In one embodiment, the display system may have a power supply unit configured to supply power to the display system and a light source configured to illuminate the display medium.

The display medium may have a plurality of display pixels and may have one, two, or more display areas. In other words, the display medium may have separate display areas for displaying two or more separate images. The first and second sets of conductive electrodes may be designed to be movable relative to the display device, and the display medium may be larger or have more pixels than the electrodes. In some embodiments, the display medium may be configured to sense external image input and the first, and second sets of electrodes may be configured to detect the external image input. The display system may also include a memory device for storing detected image data. In some embodiments, the display medium may be configured to sense external image input via one or more of thermal, optical, magnetic, electrical, resistive, inductive, mechanical, and pressure sensing techniques. The external image input may come from handwriting or other forms of input.

For the display medium, it may be one of mono-stable and bi-stable display materials or may be one of a liquid crystal, electrophoretic, electrochromic, magnetic, and electrochemical materials.

It will be apparent to those skilled in the art that various modifications and variations can be made in the display systems and various components or materials illustrated above. It is intended that the examples are exemplary only, with a true scope of the disclosed embodiments being reflected from the following claims and their equivalents.

What is claimed is:

1. A bistable display system having a display media, the display media comprising:
    a first conductive layer patterned as a plurality of first electrodes;
    a second conductive layer patterned as a plurality of second electrodes; and
    a bistable material layer between the first and the second conductive layers, wherein at least one of the first and the second conductive layers comprises at least two regions, the electrodes of a region on one conductive layer being electrically independent of the electrodes of other regions on the same conductive layer.

2. The bistable display system of claim 1, further comprising a media access head, wherein the media access head and the display media are moveable relatively to each other, the media access head having an electrical contact with at least one of the first and the second electrodes.

3. The bistable display system of claim 2, wherein the media access head comprises a write head to write at least one display status on to the display media.

4. The bistable display system of claim 2, wherein the media access head comprises a read head to read at least one display status from the display media.

5. The bistable display of system claim 1, further comprising at least two media access heads, each media access head and the display media being movable relatively to each other, each media access head having an electrical contact with at least one of the first and the second electrodes.

6. The bistable display system of claim 5, wherein one of the at least two media access heads is placed adjacent to one of the first and the second conductive layers.

7. The bistable display system of claim 1, wherein at least a portion of one of the first and the second conductive layers is optically transparent or reflective.

8. The bistable display system of claim 1, wherein the bistable material layer comprises at least one of liquid crystal material, electrophoretic material, electrochromic material, magnetic material, and electrochemical material.

9. A bistable display system comprising:
    a first set of conductive electrodes;
    a second set of conductive electrodes configured to interact with the first set of conductive electrodes for allowing at least one of a reading and a writing of a display status; and
    a display medium movably coupled with the first and second sets of conductive electrodes, wherein at least one of the first and the second sets of conductive electrodes have at least two electrically independent regions each having an independent signal input.

10. The bistable display system of claim 9, wherein the display medium is remotely coupled with the first and second set of conductive electrodes without having contact with the conductive electrodes.

11. The bistable display system of claim 9, further comprising a power supply unit configured to supply power to the bistable display system and a light source configured to illuminate the display medium.

12. The bistable display system of claim 9, wherein the display medium has a plurality of display pixels and has at least one display area.

13. The bistable display system of claim 9, wherein the first and second sets of conductive electrodes are movable relative to the display medium.

14. The bistable display system of claim 9, wherein the display medium is configured to sense an external image input and the first and second sets of electrodes are configured to detect the external image input.

15. The bistable display system of claim 14, further comprising a memory device for storing the detected external image input.

16. The bistable display system of claim 14, wherein the display medium is configured to sense the external image input via at least one of thermal, optical, magnetic, electrical, resistive, inductive, mechanical, and pressure sensing techniques.

17. The bistable display system of claim 16, wherein the external image input comprises handwriting input.

18. The bistable display system of claim 9, wherein the display medium comprises one of mono-stable and a bi-stable display materials.

19. The bistable display system of claim 9, wherein the display medium comprises one of liquid crystal, electrophoretic, electrochromic, magnetic, and electrochemical materials.

20. The bistable display system of claim 9, wherein the first and second sets of electrodes are provided as a part of a display reading and writing unit movably coupled with the display medium.

21. The bistable display system of claim 9, wherein the first set of conductive electrodes is configured to receive at least one selection signal and the second set of conductive electrodes is configured to receive at least one data signal, the at least one selection and at least one data signal being used to provide at least one of the reading and the writing of the display status to a target area of the display medium.

22. The bistable display system of claim 21, further comprising a display control circuitry being configured to perform at least one of providing the selection signal and the data signal; and identifying at least one of the electrically independent regions for signal output from the display control circuitry.

* * * * *